July 26, 1955   L. R. HERNDON, JR   2,713,796
PRESSURE MEASURING DEVICE
Filed July 3, 1950
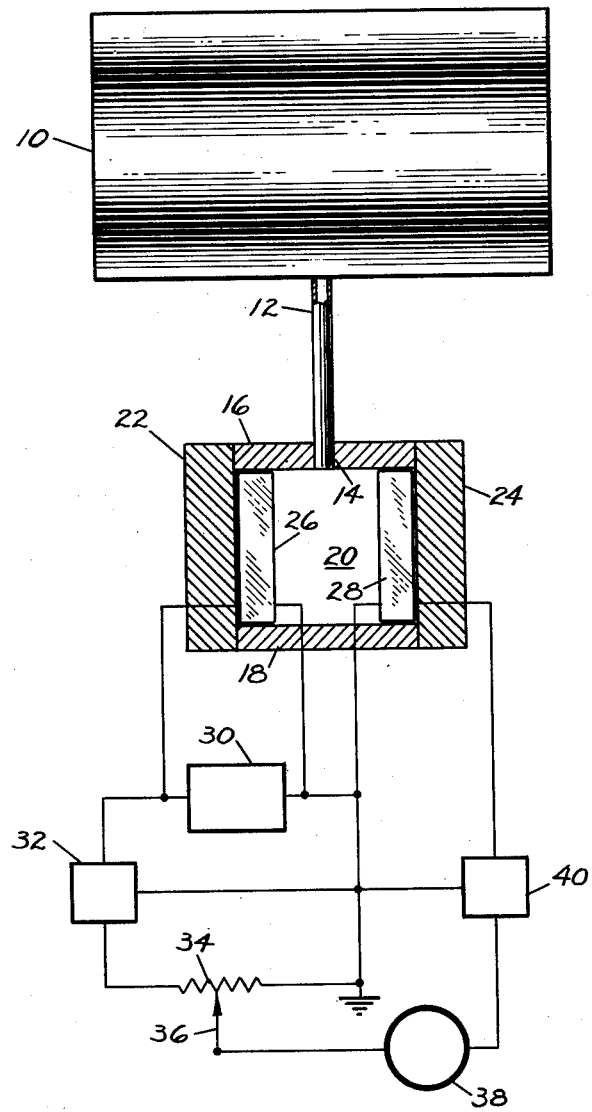
INVENTOR.
LEE R. HERNDON JR.
BY
Ellsworth R. Easton
ATTORNEY

United States Patent Office 2,713,796
Patented July 26, 1955

2,713,796

PRESSURE MEASURING DEVICE

Lee R. Herndon, Jr., Detroit, Mich., assignor to Bendix Aviation Corporation, Detroit, Mich., a corporation of Delaware Application July 3, 1950, Serial No. 171,865

8 Claims. (Cl. 73—398)

This invention relates to apparatus for determining the pressure of a gas and, more particularly, to apparatus for providing an accurate indication of gas pressure.

There are several disadvantages to the apparatus presently used to determine the pressure of a gas. For example, the operation of the apparatus varies with temperature and humidity. Furthermore, the determinations are not in a form which can provide a simple and accurate indication of pressure, especially when the pressure is relatively low.

This invention provides apparatus for producing an electrical output signal which is directly proportional to the pressure of a gas and which provides a simple and reliable indication of the gas pressure. The apparatus measures the gas pressure independently of changes in other conditions, such as temperature and humidity.

An object of this invention is to provide apparatus for determining the pressure of a gas.

Another object is to provide apparatus of the above character for producing an electrical output signal which is proportional to the pressure of a gas.

A further object is to provide apparatus of the above character for giving an indication of gas pressure without being affected by variations in such conditions as temperature and humidity.

Still another object is to provide apparatus of the above character which is simple, efficient and reliable.

Other objects and advantages will be apparent from a detailed description of the invention and from the appended drawings and claims.

In the drawings:

The single figure shows one embodiment of the invention.

Atmospheric pressure or the pressure of gas in an enclosure 10 may be measured by the embodiment of the invention shown in the drawings. If the pressure of the gas in the enclosure 10 is measured, a relatively narrow outlet 12 is provided to communicate with the enclosure and with a hole 14 in a plate 16. The plate 16 and a parallel plate 18 form a receptacle 20 with a pair of parallel plates 22 and 24, which are perpendicular to the plates 16 and 18. A first transducer, such as a crystal 26, is positioned in the receptacle 20 contiguous to the plate 22 and a second transducer, such as a crystal 28, is positioned contiguous to a plate 24. A supply 30 of alternating power is connected to the crystal 26 to supply an input signal to the crystal. The power supply 30 is also connected in series with a rectifier 32 and a potentiometer 34. The movable arm 36 of the potentiometer 34 is connected to a meter 38, which is in series with a rectifier 40, the crystal 28, and the potentiometer 34. The position of the movable arm 36 is calibrated to provide a direct indication of the gas pressure.

The receptacle 20 has a small volume compared to the enclosure 10 and does not affect the pressure of the gas which enters from the enclosure. The volume of the receptacle 20 is varied by the oscillations of the crystal 26 when the crystal is excited by the power supply 30. The parameters of the apparatus, such as the cross-sectional area and length of the outlet 12, the volume of the receptacle 20 and the frequency of the power supply 30, are so chosen as to prevent any significant flow of gas between the enclosure 10 and the receptacle 20 when the volume of the receptacle varies as a result of the input signal. However, the parameters are chosen so that the pressure of the gas in the receptacle 20 will follow the pressure of the gas in the enclosure 10. For example, the power supply 30 may have a frequency of approximately 500 cycles per second; the outlet 12 may have a diameter of approximately $1.5 \times 10^{-2}$ centimeters and a length of approximately 0.05 centimeter; and the receptacle 20 may have a volume of 0.1 cubic centimeter. Thus, changes in the volume of the receptacle 20 produce corresponding changes in the pressure which the gas in the receptacle 20 exerts upon the crystal 28. The periodic changes in gas pressure in turn cause an alternating voltage to be produced in the crystal 28 at the same frequency as the energy supplied by the power supply 30.

The alternating signals from the power supply 30 and the crystal 28 are rectified by the rectifiers 32 and 40, respectively, and the ratio between the voltages is obtained by varying the position of the potentiometer arm 36 until the current through the meter 38 becomes zero. The position of the potentiometer arm 36 provides a direct indication of the gas pressure.

When the above apparatus is operated with no transfer of heat from the receptacle 20—i. e., an adiabatic process—the relationship between the gas pressure P and the volume V of the receptacle is indicated by $$PV^y = \text{Constant}$$

where $y$ is a constant for a particular gas. If the apparatus is operated on an isothermal basis so that the temperature of the gas in the receptacle 20 always remains constant, the relationship between the pressure and volume of the gas in the receptacle is given by $$PV = \text{Constant}$$

With either an adiabatic or isothermal operation, $$PV^a = K$$

where K and $a$ are constants depending upon the type of gas used and the type of operation provided. Solving for P, $$P = KV^{-a}$$

If this expression is differentiated, $$\frac{dP}{dV} = -aKV^{-(a+1)} = -\frac{aP}{V}$$

The change in gas pressure produced by signals having an amplitude of $E_i$ from the power supply 30 is $$\Delta P = \frac{dP}{dV}\Delta V = -\frac{aP}{V}\Delta V$$

But the change $\Delta V$ in the volume of the receptacle 20 as a result of the signal $E_i$ is given by the expression:

$$\Delta V = K_1 E_i$$

where K is a constant. Substituting for $\Delta V$ $$\Delta P = \frac{-aK_1 P E_i}{V}$$

The output voltage $E_0$ which is produced by a change P of pressure is given by the relationship $E_0 = k_2 \Delta P$. Substituting for $$\Delta P, \quad E_0 = \frac{-aK_1 K_2 E_i P}{V}$$

and $$\frac{-VE_0}{aK_1K_2E_i}=P$$

Since V is a constant, $$P=\frac{K_3E_0}{E_i}$$

where $$K_3=\frac{-V}{aK_1K_2}$$

The relationship $$\frac{K_3E_0}{E_i}$$

is indicated by the position of the arm 36 in the potentiometer 34, since the ratio of the resistance between ground and the arm 36 to the total resistance of the potentiometer 34 is equal to the ratio of $E_0$ to $E_i$.

The apparatus disclosed above has several advantages. It eliminates errors caused by variations in the input voltage at the crystal 26 by providing a determination of the ratio between the input and output voltages. Since the setting of the potentiometer arm 36 is linearly proportional to pressure, calibration of the pressure at one setting of the arm 36, or at most two settings, provides an instantaneous indication of pressure at all other settings of the arm. The apparatus also operates independently of temperature and humidity and is dependent only upon variations in pressure and volume for measuring the pressure of the gas in the enclosure 10. By providing an electrical output signal which can be easily compared to an electrical input signal, a simple system for producing an accurate and reliable indication of temperature is produced.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Apparatus for measuring the pressure of a gas, including, means forming a receptacle adapted to receive some of the gas at the pressure to be measured, a first transducer in the receptacle and adapted upon the application of a signal to become changed in volume in accordance with the amplitude of the applied signal and the pressure of the gas, the receptacle having a sufficiently small volume to produce measurable variations in the pressure of the gas in accordance with the changes in volume of the first transducer, a second transducer in the receptacle and adapted to produce a signal having an amplitude substantially proportional to the change in pressure of the gas, and means for measuring the ratio of the amplitudes of the input and output signals to provide an indication of the gas pressure.

2. Apparatus for measuring the pressure of a gas, including means forming a receptacle adapted to receive some of the gas at the pressure to be measured, a first transducer adapted to vary the pressure of the gas in the receptacle in accordance with the amplitude of an applied signal and the pressure of the gas, a second transducer adapted to produce a signal having an amplitude proportional to the change in pressure, and means for measuring the ratio of the output and input signals to provide an indication of the gas pressure.

3. Apparatus for measuring the pressure of a gas, including, means forming a receptacle for some of the gas, a first transducer in the receptacle and adapted to vary the volume of the gas in accordance with the amplitude of an input signal, the receptacle having a sufficiently small volume to produce substantial variations in the pressure of the gas in accordance with the variations in the volume of the gas, a second transducer in the receptacle and adapted to provide an output signal having an amplitude dependent upon the change in pressure of the gas resulting from the change in volume of the gas, and means for measuring the ratio of the amplitudes of the input and output signals to provide an indication of the pressure of the gas.

4. Apparatus for measuring the pressure of a gas, including, a receptacle having an inlet for the introduction of gas at the pressure to be measured, first and second transducers positioned in the receptacle, means for applying input signals having a predetermined amplitude to the first transducer to provide a pressure variation proportional to the amplitude of the signals and the pressure of the gas, the second transducer being adapted to provide an output signal proportional to the pressure variation of the gas, and means for measuring the ratio of the input and output signals to provide an indication of the pressure of the gas.

5. Apparatus for measuring the pressure of a gas, including, a receptacle having an inlet for the introduction of gas at the pressure to be measured, the receptacle having a sufficiently small volume to produce substantial variations in the pressure of the gas in accordance with variations in the volume occupied by the gas; a first transducer positioned at one side of the receptacle, means for applying signals of alternating voltage to the transducer to provide a change in the volume of the transducer proportional to the amplitude of the signals and the pressure of the gas and to provide a corresponding variation in the pressure of the gas, a second transducer positioned at the opposite side of the receptacle from the first transducer and adapted to produce output signals having an amplitude substantially proportional to the amplitude of the input signals and to the pressure of the gas, a first rectifier connected to the first transducer for receiving the input signals, a second rectifier connected to the second transducer for receiving the output signals, and means connected between the first and second rectifiers for measuring the ratio of the amplitudes of the input and output signals to provide an indication of the pressure of the gas.

6. Apparatus for measuring the pressure of a gas, including, a receptacle having an inlet for the introduction of gas at the pressure to be measured, a first transducer positioned at one side of the receptacle, means for applying signals of alternating voltage to the transducer to provide a pressure variation of the gas proportional to the amplitude of the signals and the pressure of the gas, a second transducer positioned at the opposite side of the receptacle from the first transducer and adapted to produce output signals having an amplitude substantially proportional to the amplitude of the input signals and to the pressure of the gas, means for rectifying the signals applied to the first transducer, means for rectifying the signals produced by the second transducer, and means for measuring the ratio of the rectified signals to provide an indication of the gas pressure.

7. Apparatus for measuring the pressure of a gas, including, a receptacle having an inlet for the introduction of gas at the pressure to be measured, a first transducer positioned at one side of the receptacle, means for applying signals of alternating voltage to the transducer to provide a pressure variation of the gas proportional to the amplitude of the signals and the pressure of the gas, a second transducer positioned at the opposite side of the receptacle from the first transducer and adapted to produce signals having an amplitude substantially proportional to the amplitude of the input signals and to the pressure of the gas, means for rectifying the signals applied to the first transducer, means for rectifying the signals produced by the second transducer, a potentiometer having a first stationary terminal connected to the first rectifying means and having a second stationary terminal connected to a reference potential and also having a movable arm, and a null detector connected to the second rectifying means and the movable arm of the potentiometer to provide a zero reading upon the proper positioning of the movable arm for the particular pressure of the gas.

8. Apparatus for measuring the pressure of a gas, including, a receptacle having a sufficiently small volume to produce substantial varations in the pressure of a gas in the receptacle in accordance with variations in the volume of the gas in the receptacle, there being an inlet to the receptacle for the introduction of gas at the pressure to be measured, a first transducer positioned at one side of the receptacle, means for applying signals of alternating voltage to the transducer to provide a variation in the volume of the transducer proportional to the amplitutre of the signals and the pressure of the gas and to provide a corresponding variation in the pressure of the gas, a second transducer positioned at the opposite side of the receptacle from the first transducer and adapted to produce signals having an amplitude substantially proportional to the amplitude of the input signals and to the pressure of the gas, means for rectifying the signals applied to the first transducer, means for rectifying the signals produced by the second transducer, a potentiometer having a movable arm and a pair of stationary contacts, one of the stationary contacts being connected to the first rectifying means and the other stationary contact being connected to receive a fixed reference potential and a null detector having a pair of terminals connected to the second rectifier means and to the movable arm of the potentiometer to provide a zero reading upon the proper positioning of the movable arm to indicate the pressure of the gas.

References Cited in the file of this patent

UNITED STATES PATENTS

| 1,570,781 | Ruben | Jan. 26, 1926 |
| 2,164,638 | Broeze et al. | July 4, 1939 |
| 2,527,208 | Berry et al. | Oct. 24, 1950 |

FOREIGN PATENTS

| 268,353 | Germany | Dec. 13, 1913 |
| 694,803 | Germany | Aug. 8, 1940 |
| 714,992 | Germany | Dec. 11, 1941 |